(12) United States Patent
Lamb

(10) Patent No.: US 9,751,447 B2
(45) Date of Patent: *Sep. 5, 2017

(54) LIQUID TOPPINGS DISPENSING SYSTEM

(71) Applicant: Kona Ice, Inc., Florence, KY (US)

(72) Inventor: Tony Lamb, Walton, KY (US)

(73) Assignee: Kona Ice, Inc., Florence, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/870,439

(22) Filed: Sep. 30, 2015

(65) Prior Publication Data

US 2016/0121778 A1    May 5, 2016

Related U.S. Application Data

(63) Continuation of application No. 13/779,650, filed on Feb. 27, 2013, now Pat. No. 9,321,387.

(51) Int. Cl.
*B60P 3/025* (2006.01)
*B67D 1/08* (2006.01)

(52) U.S. Cl.
CPC .......... *B60P 3/0257* (2013.01); *B67D 1/0889* (2013.01)

(58) Field of Classification Search
CPC ......... B60P 3/0257; A47B 31/04; A23G 9/28; A23G 9/281; A23G 9/282; A47F 1/04
See application file for complete search history.

(56) References Cited

U.S. PATENT DOCUMENTS

| | | | |
|---|---|---|---|
| 184,292 A | 11/1876 | Matthews | |
| 1,327,248 A | 1/1920 | Moody | |
| 2,733,094 A | 1/1956 | Carlton | |
| 2,982,578 A | 5/1961 | Lowe | |
| 3,191,400 A | 6/1965 | Swenson | |
| 3,395,503 A | 8/1968 | Greenberg et al. | |
| 3,476,295 A | 11/1969 | Telfer | |
| 3,887,132 A | 6/1975 | Widmer | |
| 4,076,349 A | 2/1978 | Gettleman et al. | |
| 4,225,059 A | 9/1980 | Kappos | |

(Continued)

FOREIGN PATENT DOCUMENTS

| | | |
|---|---|---|
| CA | 2357142 A1 | 3/2003 |
| DE | 9405207 U1 | 5/1994 |
| DE | 29506844 U1 | 6/1995 |

OTHER PUBLICATIONS

U.S. Office Action in U.S. Appl. No. 12/171,930, dated May 19, 2011.

(Continued)

*Primary Examiner* — J. Casimer Jacyna
(74) *Attorney, Agent, or Firm* — Wood Herron & Evans LLP

(57) ABSTRACT

A mobile confectionary apparatus includes a vehicle with at least one upstanding side wall. An interior space may be surrounded by the upstanding side wall. An opening may extend through the side wall. A liquid toppings dispensing system is adjustably positionable adjacent to the side wall and includes a first plurality of liquid dispensers configured to dispense at least one liquid topping. The liquid toppings dispensing system is pivotable relative to the side wall between a first position and a second position. The liquid toppings dispensing system is located externally of the side wall in each of the first and second positions.

11 Claims, 7 Drawing Sheets

(56) References Cited

U.S. PATENT DOCUMENTS

| | | | |
|---|---|---|---|
| 4,288,034 A | 9/1981 | Widmer et al. | |
| 4,359,073 A | 11/1982 | de Stoutz | |
| 4,456,149 A | 6/1984 | Sciortino | |
| 5,154,317 A | 10/1992 | Roppolo, III | |
| 5,307,957 A | 5/1994 | Carlsson et al. | |
| 5,375,767 A | 12/1994 | Thorstensson | |
| 5,452,825 A | 9/1995 | Comstock et al. | |
| 5,564,597 A | 10/1996 | Koorse et al. | |
| 6,189,944 B1 | 2/2001 | Piche | |
| 7,044,335 B2 | 5/2006 | Aguirre et al. | |
| 7,152,812 B1 | 12/2006 | Johnson | |
| 7,413,132 B1 | 8/2008 | Bogart et al. | |
| D580,071 S | 11/2008 | Evans et al. | |
| 7,669,740 B2 | 3/2010 | Saunders et al. | |
| D633,007 S | 2/2011 | Evans | |
| 8,157,136 B2 * | 4/2012 | Lamb | B60P 3/0257 222/108 |
| 8,915,407 B2 * | 12/2014 | Lamb | B60P 3/0257 141/231 |
| 9,321,387 B2 * | 4/2016 | Lamb | B60P 3/0257 |
| 2014/0027471 A1 | 1/2014 | Tollefson et al. | |

OTHER PUBLICATIONS

U.S. Office Action in U.S. Appl. No. 13/439,923, dated Sep. 26, 2012.

Martin Mobile Fleet Wash Systems, "Car Wash Equipment," N.p., n.d. Web. Jun. 19, 2014, <http://www.hotfrog.com/Companies/Martin-Mobile-Fleet-wash-Systems/car-wash-equipment-236538>.

U.S. Office Action in U.S. Appl. No. 13/779,650, dated Nov. 8, 2013.

U.S. Final Office Action in U.S. Appl. No. 13/779,650, dated Apr. 8, 2014.

U.S. Advisory Action in U.S. Appl. No. 13/779,650, dated Jul. 10, 2014.

U.S. Office Action in U.S. Appl. No. 13/779,650, dated Sep. 19, 2014.

U.S. Final Office Action in U.S. Appl. No. 13/779,650, dated Nov. 14, 2014.

U.S. Advisory Action in U.S. Appl. No. 13/779,650, dated Dec. 16, 2014.

U.S. Office Action in U.S. Appl. No. 13/779,650, dated May 12, 2015.

U.S. Notice of Allowance in U.S. Appl. No. 13/779,650, dated Sep. 21, 2015.

Author: Snowie Shaved Ice, Title of the publication: Snowie Bus 3.0, Publication Date: Mar. 25, 2010, Publisher: YouTube, Place of publication: https://www.youtube.com/watch?v=ZKR8k70-ASc, Retrieval date: Nov. 2, 2016.

Author: Snowie Shaved Ice, Title of the publication: Snowie SchoolBus Owners Manual, Pages being submitted: All, including front cover and rear cover. Publication Date: Oct. 31, 2012, Publisher: Snowie Shaved Ice, Place of publication: Nationwide distribution to all Bus owners.

* cited by examiner

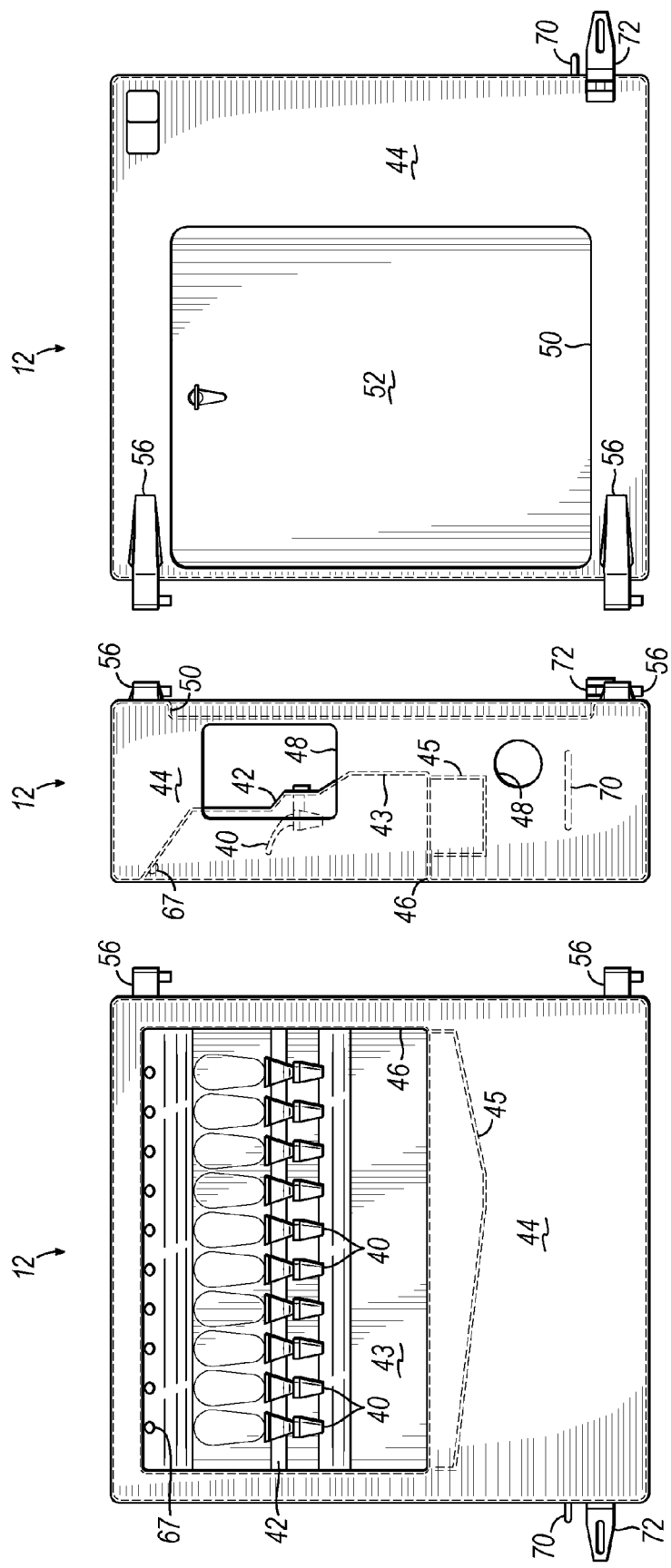

LIQUID TOPPINGS DISPENSING SYSTEM

CROSS-REFERENCE TO RELATED APPLICATIONS

The present application is a continuation of U.S. patent application Ser. No. 13/779,650, filed Feb. 27, 2013, and is related to U.S. Pat. No. 8,157,136, issued Apr. 17, 2012, and entitled "MOBILE CONFECTIONARY APPARATUS WITH PROTECTIBLE DISPENSING SYSTEM," each disclosure of which is expressly incorporated by reference herein in its entirety.

FIELD OF THE INVENTION

The present invention relates generally to a mobile apparatus for serving confections and, more particularly, to a mobile confectionary apparatus for dispensing beverages and/or frozen confections.

BACKGROUND OF THE INVENTION

Mobile confectionaries for selling confections (e.g., snow cones, shaved ice, ice cream, and beverages) have been around for years. Mobility may be provided via truck, trailer, or mobile kiosk and may bring confection sales to places that as a matter of general operation may not have any vending available. These locations may include, for example, festivals, parks, and residential neighborhoods. The dispensing of liquids, likes drinks and flavorings, has typically been done by a person within the truck/trailer, or by the customer at a kiosk.

Structurally, a mobile confectionery will typically include a box-like enclosure having an interior work space outfitted for the preparation and sale of the confections and at least one service window through which the confections are transferred to the customer and the transaction conducted. The work space is typically large enough for at least one person and contains apparatuses for preparing the confections and may include, for example, ice shaving or crushing equipment, slush making devices, ice cream/custard dispensing apparatuses, or the like.

It has been found that in this industry, profitability and customer satisfaction are largely dependent upon providing quality products and fast service. Profitability may also be time sensitive. This may be the case when crowds are present before or after a show or concert or during an intermission when people flood a given area and then depart that area in a short amount of time. In this situation, the length of a line at any individual vendor may be the determining factor for people who arrive after the initial wave of people. A long line at one confectionary may drive later-arriving customers to another vendor with a shorter line. Fast service may drive profitability in this instance. Keeping the line short is an invitation to later-arriving potential customers.

Another factor in customer satisfaction, particularly for frozen confections, such as shaved ice, snow cones, and the like, is the quantity of topping or flavoring applied to the confection. More is most often better. Yet applying more flavoring requires more time and can cause the wait time to increase to the detriment of potential customers. Because confectionaries are a favorite of children, another factor that drives up wait time, and thus drives away potential customers, is waiting for a child to select their topping or flavoring.

Thus, what is sought is a mobile confectionary apparatus, which increases customer satisfaction and increases productivity, particularly for frozen confections, and which overcomes one or more of the shortcomings and problems set forth above.

SUMMARY OF THE INVENTION

The present invention overcomes the foregoing and other shortcomings and drawbacks of liquid toppings dispensing systems heretofore known for use in mobile confectionary apparatuses. While the invention will be described in connection with certain embodiments, it will be understood that the invention is not limited to these embodiments. On the contrary, the invention includes all alternatives, modifications and equivalents as may be included within the spirit and scope of the present invention.

In accordance with the principles of the present invention, a mobile confectionary apparatus comprises a vehicle that includes at least one upstanding side wall. An interior space is surrounded by the at least one upstanding side wall and is configured to receive at least one person. An opening extends through the at least one upstanding side wall and through which an item may be passed from the interior space to outside of the vehicle.

A liquid toppings dispensing system is attachable to the at least one upstanding side wall and includes a first plurality of liquid dispensers configured to dispense at least one liquid topping onto the item. The liquid toppings dispensing system is pivotable relative to the at least one upstanding side wall between a first position and a second position, with the liquid toppings dispensing system being located externally of the at least one upstanding side wall in each of the first and second positions.

According to one aspect of the present invention, the at least one upstanding side wall includes a pair of opposing side walls and a rear wall extending transversely between the pair of opposing side walls.

According to another aspect of the present invention, a longitudinal axis of the liquid toppings dispensing system is disposed generally parallel to one of the pair of opposing side walls in the first position.

According to another aspect of the present invention, a longitudinal axis of the liquid toppings dispensing system is disposed generally parallel to the rear wall in the second position.

According to another aspect of the present invention, the opening is provided in one of the opposing side walls and the liquid toppings dispensing system is oriented generally parallel to the one opposing side wall in the first position.

According to another aspect of the present invention, a mobile confectionary apparatus comprises a vehicle including at least one upstanding side wall and a liquid toppings dispensing system being supported by the at least one upstanding side wall. The liquid toppings dispensing system includes a plurality of liquid dispensers configured to dispense at least one liquid topping onto the item. The liquid toppings dispensing system is pivotable relative to the at least one upstanding side wall between a first position and a second position, with the liquid toppings dispensing system being located externally of the at least one upstanding side wall in each of the first and second positions.

The above and other objectives and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

FIG. 5A is a front elevational view of the liquid toppings dispensing system shown in FIG. 1 according to one embodiment;

FIG. 5B is a side elevational view of the liquid toppings dispensing system shown in FIG. 1 according to one embodiment;

FIG. 5C is a rear elevational view of the liquid toppings dispensing system shown in FIG. 1 according to one embodiment;

DETAILED DESCRIPTION OF THE INVENTION

Figure 1:
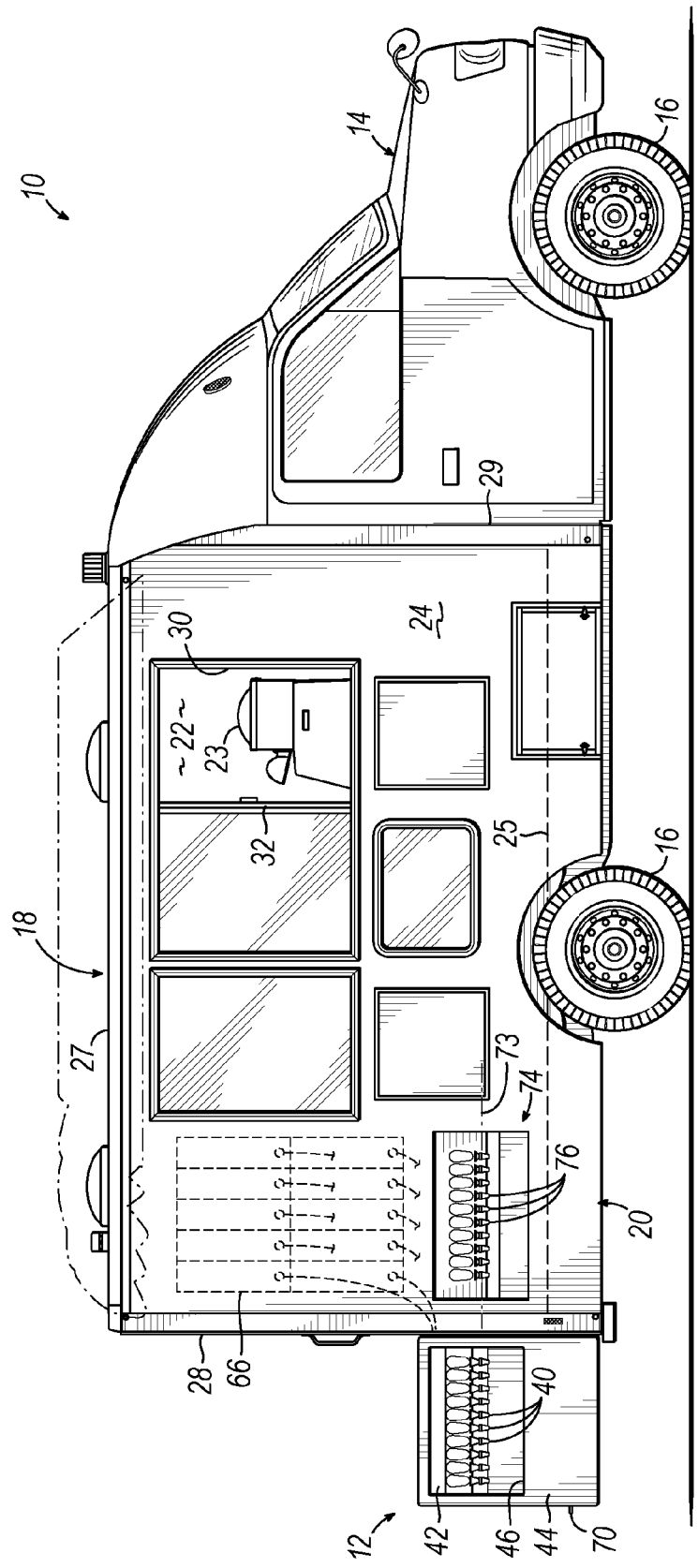
FIG. 1 is a side view of a mobile confectionary apparatus including a liquid toppings dispensing system shown pivoted to a first position according to one embodiment of the present invention.
Figure 2:
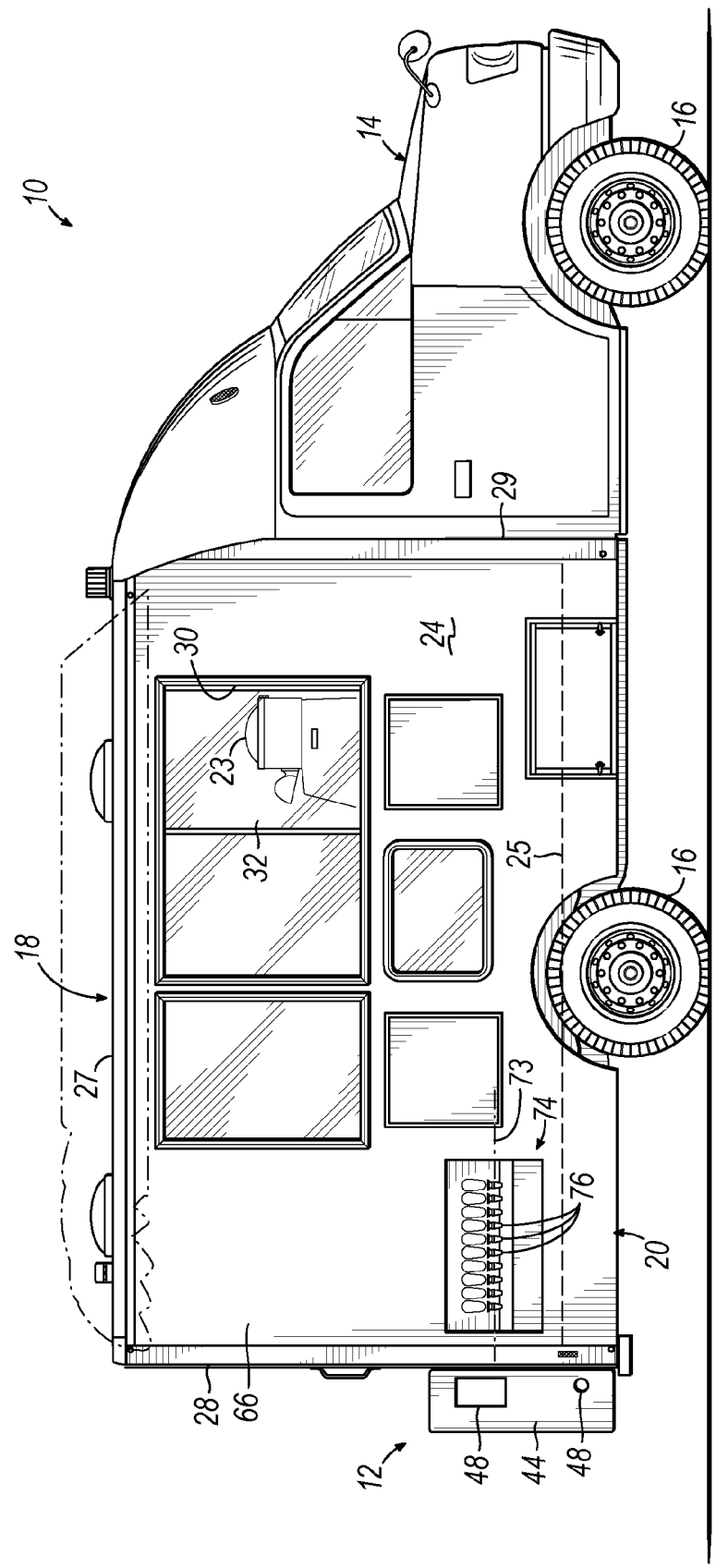
FIG. 2 is a view similar to FIG. 1 showing the liquid toppings dispensing system pivoted to a second position according to one embodiment of the present invention.

Referring now to the drawings, and to FIGS. 1 and 2 in particular, in one embodiment, a mobile confectionary apparatus 10 provides a mobile platform for making and serving frozen confections, such as, but not limited to, shaved ice and/or snow cones to customers. A liquid topping, such as a flavored syrup, may then be applied to the frozen confection by the customer. In this regard and according to embodiments of the present invention, the mobile confectionary apparatus 10 includes a liquid toppings dispensing system 12, described in detail below. Generally, the liquid toppings dispensing system 12 is configured to dispense one or more liquid toppings, such as flavored syrups, onto the frozen confections served to the customer. A customer having been previously served with a frozen confection may selectively self-serve one or more of the liquid toppings onto the frozen confection as desired from the liquid toppings dispensing system 12. The mobile confectionary apparatus 10 as described herein may advantageously increase the number of customers that may be served over any given period of time. Accordingly, embodiments of the present invention may increase revenues generated by the sales of frozen confections from the mobile confectionary apparatus 10 while also positively influencing customer satisfaction by reducing the possibility of potentially long wait lines.

To these and other ends and with continued reference to FIG. 1, in one embodiment, the mobile confectionary apparatus 10 may include a vehicle chassis 14. In the representative embodiment shown, the chassis 14 is a truck chassis and includes an engine and drive train (not shown) for rotating one or more wheels 16 in a conventional manner and for propelling the vehicle chassis 14 in both the forward and reverse directions over roads and the like to various destinations. As shown, the vehicle chassis 14 supports a mobile structure 18 that includes an upstanding side wall 20. It will be appreciated that embodiments of the present invention are not limited to trucks. For example, the vehicle chassis 14 may include a trailer chassis (not shown) that is towable by a vehicle, such as, a truck, as is known in the art. In this situation, the mobile structure 18 may be mounted onto the trailer chassis.

In one embodiment, as is described in more detail below, the liquid toppings dispensing system 12 may be releasably or removably attached to the upstanding side wall 20 and may be movable or pivotable to at least two different positions, such as first and second positions, as is shown according to one embodiment in FIGS. 1 and 2, respectively. Visually, in the first position as shown in FIG. 1, the liquid toppings dispensing system 12 may provide an overall lengthening of the mobile confectionary apparatus 10 relative to a second position as shown in FIG. 2. While the liquid toppings dispensing system 12 may be pivoted to many different orientations, the system 12 may be operable by customers to self-serve a liquid topping when the system 12 is pivoted to the position shown in FIG. 1, by way of example. In the second position as shown in FIG. 2, the liquid toppings dispensing system 12 may not be operable, or may be oriented in this second position to change the location in which the customer accesses the system 12 for dispensing liquid toppings onto a frozen confection or simply as a transport position during movement of the mobile confectionary apparatus 10. It will be appreciated that certain geographic locations at which the apparatus 10 is positioned for business may have a reduced space within which to operate, and the second position of the liquid toppings dispensing system 12 as shown in FIG. 2 may allow the mobile confectionary apparatus 10 to physically fit within the confines of a reduced area and still retain the improved throughput as set out above. Alternatively, the second position of the liquid toppings dispensing system 12 as shown in FIG. 2 may be a temporary storage position, which may be utilized during movement of the mobile confectionary apparatus 10 or in other situations.

As shown in FIG. 1, the upstanding side wall 20 encloses an interior space 22 and separates the interior space 22 from the environment outside of the structure 18. The interior space 22 is configured to hold equipment 23, such as, equipment for preparing shaved ice, snow cones, and/or other frozen confections. It will be appreciated that other equipment, in addition or as an alternative to equipment 23, may be located within the interior space 22 including, but not limited to, a freezer and/or a cooler. Interior space 22 is sufficiently large for one or more people to operate the equipment 23 and to serve customers from within the structure 18. It will be appreciated that the liquid toppings dispensing system 12 is not within the interior space 22. Rather, in the embodiment shown, the liquid toppings dispensing system 12 may be only accessible from outside of the mobile structure 18.

In the representative embodiment shown, the interior space 22 is bounded by the upstanding side wall 20, a floor 25, and a roof 27. Roof 27 is spaced sufficiently above the floor 25 to allow a person to stand within the interior space 22. In one embodiment, the upstanding side wall 20 includes a side wall 24, a second side wall (not shown) opposite the side wall 24, a rear wall 26 extending transversely between the pair of side walls that are joined at corners 28 (one corner shown), and a front wall 29. As shown, the side wall 24 is generally parallel to the forward and reverse directions in which the mobile confectionary apparatus 10 moves. The rear wall 26 is generally perpendicular to the side wall 24.

With continued reference to FIG. 1, the wall 20 may include a service opening 30 through which a person in the interior space 22 can conduct business by passing frozen confections to customers and receiving money from customers outside of the structure 18. The service opening 30 is located at a suitable elevation above the ground on which the mobile confectionary apparatus 10 rests. A service window 32 may be operable by a person in the interior space 22 between an opened position (shown in FIG. 1) in which the person in the interior space 22 may make transactions through the service opening 30 and a closed position (shown in FIG. 2) in which the service opening 30 is closed or obstructed by the window 32.

As described above with reference to FIGS. 1 and 2, the liquid toppings dispensing system 12 may be movable or pivotable between at least two different positions relative to the structure 18. That is, a person may swing or pivot the liquid toppings dispensing system 12 about its point of attachment to the structure 18 from at least one position to another position. Once the liquid toppings dispensing system 12 is positioned in either of the first or second positions, the customer, after having been served via the opening 30, may simply follow the side wall 24 to the liquid toppings dispensing system 12 in order to self-serve liquid toppings from the system 12. Thus, the location and orientation of the liquid toppings dispensing system 12 in either of the first or second positions as shown in FIGS. 1 and 2, by way of example, may enhance the flow of customers through the service process, that is, first the flow of customers to the opening 30 to receive a frozen confection or container and then from the opening 30 to the liquid toppings dispensing system 12 to dispense the liquid toppings onto the frozen confection or into the container.

Figure 3A:
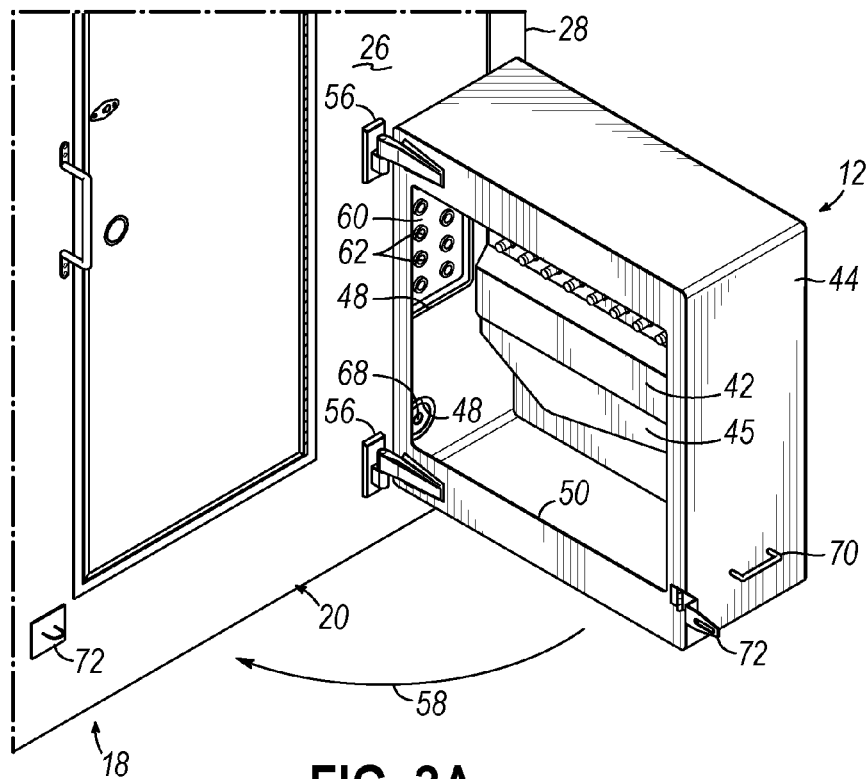
FIG. 3A is a perspective view of the liquid toppings dispensing system pivoted to the first position as illustrated in FIG. 1.
Figure 3B:
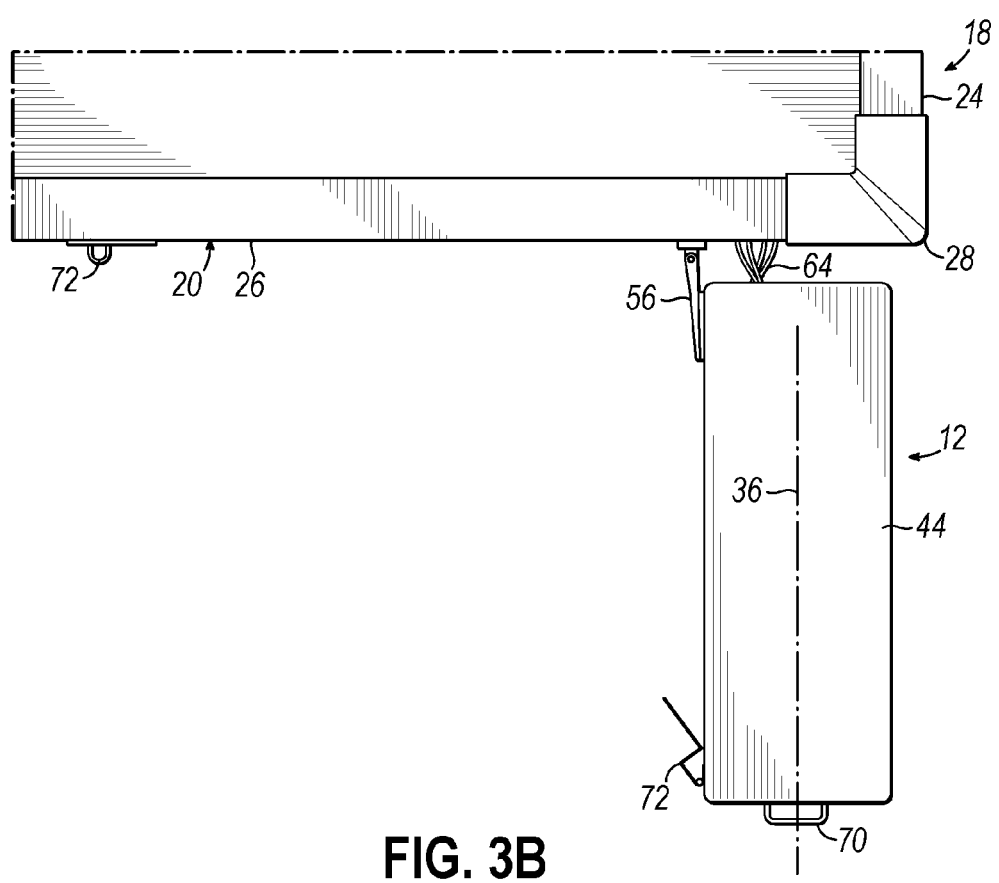
FIG. 3B is a top plan view of the liquid toppings dispensing system shown in FIG. 3A.

In the first position, as is shown in FIGS. 1, 3A, and 3B, the liquid toppings dispensing system 12 may extend outwardly from the rear wall 26 at a suitable height so as to be manually operable by a customer located outside of the mobile confectionary apparatus 10 for dispensing a liquid topping, such as flavored syrup, on a confection. That is, a longitudinal axis 36 (FIG. 3B) or a major length dimension of the liquid toppings dispensing system 12 may extend in a generally transverse direction relative to the rear wall 26. In the exemplary embodiment, the longitudinal axis 36 of the liquid toppings dispensing system 12 is oriented generally perpendicular to the rear wall 26. Furthermore, when the liquid toppings dispensing system 12 is in the first position as shown in FIG. 1, the longitudinal axis 36 of the liquid toppings dispensing system 12 extends in a direction that is generally parallel to the side wall 24. As described above, the liquid toppings dispensing system 12 may be pivoted from the first position shown in FIG. 3A to the second position shown in FIG. 4A when there is insufficient room for the system 12 to extend transversely (e.g., perpendicularly) from the rear wall 26 or prior to moving the mobile confectionary apparatus 10. In the second position, the longitudinal axis 36 of the liquid toppings dispensing system 12 may be oriented generally parallel to the rear wall 26.

Further with regard to positioning of the liquid toppings dispensing system 12, embodiments of the present invention are not limited to the system 12 being oriented at an approximately perpendicular angle relative to the rear wall 26 in the first position, and generally parallel with the rear wall 26 in the second position. Other orientations than those shown are possible in which a customer may self-serve the liquid toppings. For example, the longitudinal axis 36 of liquid toppings dispensing system 12 may extend at an angle that is a not perpendicular relative to the rear wall 26. In such an orientation, the liquid toppings dispensing system 12 may still provide an overall relative visual lengthening of the structure 18 and provide a natural flow to the self-serve liquid dispensing process from the opening 30 to the system 12.

In addition to the angular orientation of the liquid toppings dispensing system 12, the location on the wall 20 to which the system 12 is attached may vary. In the embodiment shown, and with reference to FIG. 3B, the liquid toppings dispensing system 12 may be secured proximate to the corner 28 as shown. In this sense, the liquid toppings dispensing system 12 may be visible to customers standing at or near the opening 30. Generally, the liquid toppings dispensing system 12 may be secured to the structure 18 nearer to the side wall 24 than to the centerline of the structure 18. At described above, when the liquid toppings dispensing system 12 is positioned nearer to the corner 28, customers may see and obtain easy access to the liquid toppings. By way of example, the liquid toppings dispensing system 12 may be secured to the rear wall 26 such that a front surface of the system 12 is substantially flush with the side wall 24. It will be appreciated that the liquid toppings dispensing system 12 may project beyond a plane defined by the side wall 24 and so the position of the system 12 is not specifically limited to the orientations shown.

Figure 4A:
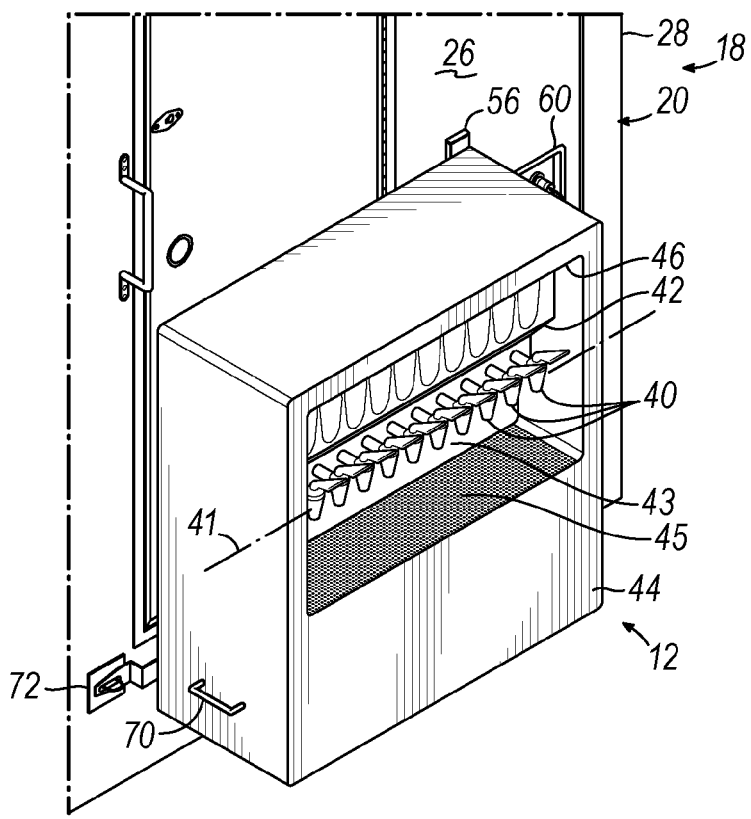
FIG. 4A is a perspective view of the liquid toppings dispensing system shown pivoted to the second position as illustrated in FIG. 2.
Figure 4B:
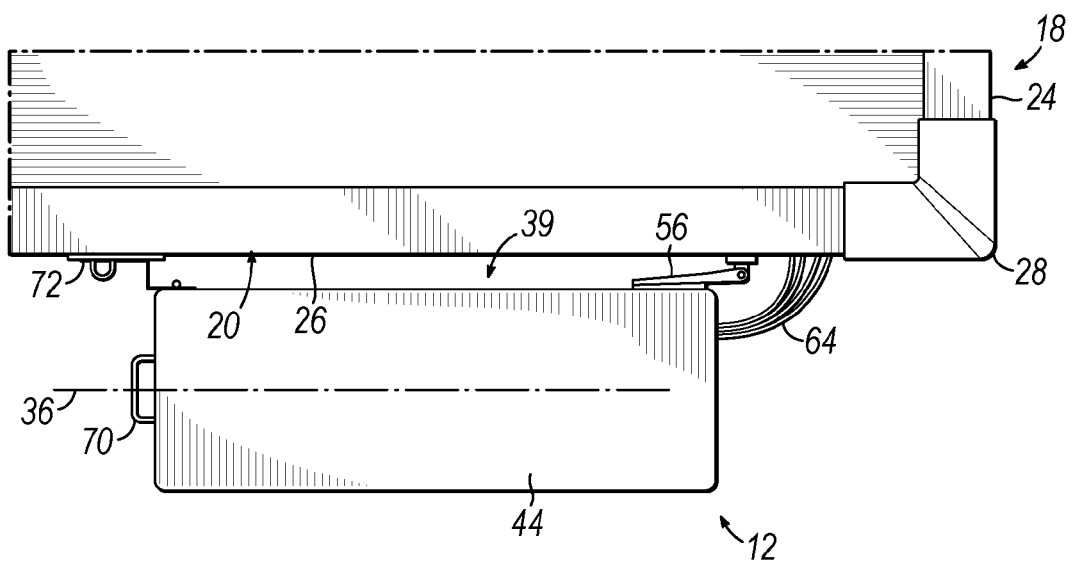
FIG. 4B is a top plan view of the liquid toppings dispensing system shown in FIG. 4A.

In one embodiment of the present invention, the liquid toppings dispensing system 12 is movable or pivotable to at least one other position (e.g., the second position, as shown in FIGS. 2, 4A, and 4B), with the liquid toppings dispensing system 12 being spaced laterally from the upstanding side wall 20 by a gap 39 (see FIG. 4B). Unlike the first position of the liquid toppings dispensing system 12 shown in FIG. 1, the second position shown in FIG. 2 may orient the longitudinal axis 36 of the liquid toppings dispensing system 12 generally parallel to the rear wall 26 (shown best in FIG. 4B). When the liquid toppings dispensing system 12 is in the second position shown in FIG. 2, the system 12 may still be usable in that customers who have been served via the window 32 may proceed to the rear wall 26 of the mobile confectionary apparatus 10 to self-serve the liquid topping from the system 12. In one embodiment of the present invention, the liquid toppings dispensing system 12 may not be operable in the second position shown in FIG. 4A.

While the figures generally illustrate the liquid toppings dispensing system 12 as being removably attached to and pivotable relative to the rear wall 26 (see, for example, FIG. 6), it will be appreciated that embodiments of the present invention are not limited to the liquid toppings dispensing system 12 being secured to the rear wall 26. In this regard, the liquid toppings dispensing system 12 may be removably attached to, and pivotable with respect to, the side wall 24.

With reference now to FIGS. 4A and 5A, in one embodiment, the liquid toppings dispensing system 12 may include a plurality of liquid dispensers 40 that are configured to selectively dispense the liquid toppings onto a frozen confection. In one embodiment, the liquid dispensers 40 are arranged along an axis 41 (FIG. 4A) that is generally parallel to the longitudinal axis 36 of the liquid toppings dispensing system 12. While liquid toppings, such as flavored syrups, are described herein, it will be appreciated that the liquid dispensers 40 may be configured to dispense a beverage into a container, such as a cup or the like. The plurality of liquid dispensers 40 may be arranged along and secured to a support panel 42 that includes a backsplash 43. The support panel 42 and backsplash 43 may be enclosed within a housing 44. A catch basin 45 may be disposed beneath the liquid dispensers 40 and configured to drain spilled liquid topping to a waste container (not shown). It will be appreciated that the number of liquid dispensers 40 may dictate the overall dimensions and thus the length of the longitudinal axis 36 of the liquid toppings dispensing system 12. The liquid dispensers 40 may be accessed and operated by customers via an opening 46 in the housing 44.

With reference to FIGS. 3A, 5A, 5B, and 6, in one embodiment, the housing 44 may further include one or more utility access openings 48 on one side of the housing 44 through which electrical and fluid connections may be made to equipment within the structure 18. In one embodiment, the structure 18 includes a hookup panel 60 located on the rear wall 26 that includes a plurality of liquid dispensing ports 62 and an electrical outlet 63. The panel 60 may align with one of the utility access openings 48 in the housing 44 when the liquid toppings dispensing system 12 is positioned as shown in FIG. 3A. The number of liquid dispensing ports 62 may correspond to the number of liquid dispensers 40. It will be appreciated that a plurality of fluid delivery conduits or tubes 64 may be releasably contacted to the individual liquid dispensing ports 62 via conventional quick connect/disconnect connectors, and extend between the liquid dispensing ports 62 and the corresponding liquid dispensers 40. The liquid dispensing ports 62 may be fluidly coupled to one or more reservoirs 66 (shown in FIG. 1) of the liquid toppings. As shown in FIG. 1, the reservoirs 66 may be positioned within the structure 18. The tubes 64 may direct liquid toppings from the reservoirs 66 to the corresponding liquid dispensers 40, as needed, during operation of the mobile confectionary apparatus 10. It will be appreciated that embodiments of the present invention are not limited to the reservoirs 66 being positioned within the structure 18, as it may be beneficial to have a reservoir provided within the housing 44. In addition, an electrical cable 65 may be releasably coupled in a conventional manner to the electrical outlet 63 for providing electrical power to devices on or in the housing 44. By way of example, the electrical cable 65 may be configured to power a plurality of display lights 67 (e.g., 12V LED lights) within the housing 44. As shown in FIG. 5A, the display lights 67 are arranged to illuminate at least the liquid dispensers 40 during operation.

Figure 6:
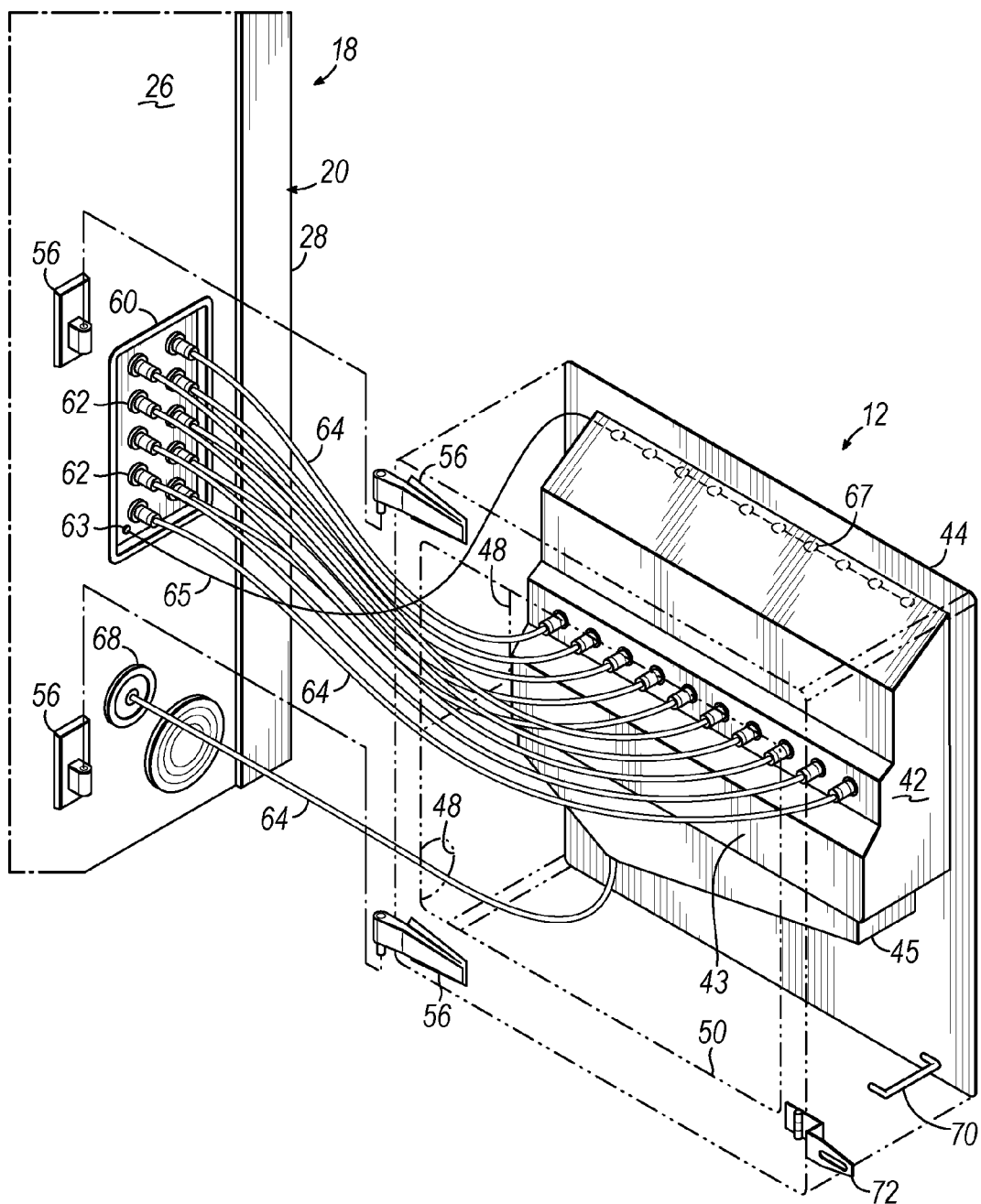
FIG. 6 is a disassembled perspective view of the liquid toppings dispensing system shown in FIG. 1 according to one embodiment, showing fluid connection of the liquid toppings dispensing system with a mobile structure.

The structure 18 may further include a waste line port 68 that aligns with another one of the utility access openings 48 and the housing 44, as shown in FIG. 3A. The waste line port 68 may be configured to transport any liquid topping drippings captured by the catch basin 45 from within the housing 44 back to the structure 18 via tube 64 (FIG. 6). Furthermore, the tubes 64 may be configured to be disconnected from the port 62 and/or the liquid dispensers 40, the port 68 and/or the catch basin 45, and the electrical cable 65 may be configured to be disconnected from the electrical outlet 63, in situations in which the housing 44 is detached from the structure 18 as described in greater detail below.

Referring now to FIG. 5C, in one embodiment, the housing 44 further includes a utility access opening 50 in the side of the housing 44 opposite the opening 46. A door 52 may close off the opening 50. And, when the liquid dispensers 40 or other equipment enclosed by the housing 44 require service, the door 52 may be removed to allow access to within the housing 44.

With reference to FIGS. 3A and 6, in one embodiment, one or more hinges 56 may be utilized to pivotably attach the housing 44 to the wall 20 of the structure 18. In this regard, the hinges 56 provide an axis of rotation about which the liquid toppings dispensing system 12 may be pivoted relative to the structure 18 (indicated by arrow 58 in FIG. 3A). It will be appreciated that the hinges 56 may allow the liquid toppings dispensing system 12 to be oriented in any one of a number of orientations relative to the rear wall 26 and the side wall 24 as set out above. However, the hinges 56 may include a stop or another mechanism by which the housing 44 is held in a fixed position while customers operate the liquid dispensers 40. In one embodiment, the liquid toppings dispensing system 12 is secured in place in the first position as shown in FIG. 1 using a fastening system, not shown.

Further in this regard, as shown in FIG. 6, in one embodiment, the individual leaves of the hinges 56 may be separable allowing the housing 44 to be easily disconnected from the structure 18. By way of example and without limitation, the hinges 56 may be slip-joint or take-apart type hinges by which the corresponding leaves may be separately secured to the structure 18 and to the housing 44 when the hinge 56 is disassembled. In the embodiment shown, the housing 44 may further include a handle 70 to allow a person to lift the housing 44 and separate the individual leaves of hinges 56. It will be appreciated that the housing 44, once separated from the structure 18, may be stored within the structure 18 should that be necessary prior to moving the mobile confectionary apparatus 10 or for another reason.

Alternatively, when the liquid toppings dispensing system 12 is oriented in the position shown in FIG. 4A, it may be releasably secured to the rear wall 26 by the hinges 56 provided on one end thereof and by a latch mechanism 72 provided at the other end thereof.

While hinges 56 are shown according to one embodiment, those of ordinary skill in the art will readily appreciate that other hinge structures, or other known structures for providing a pivotable or rotatable connection between two components, are possible as well without departing from the spirit and scope of the present invention.

In one embodiment, as shown in FIG. 1, the mobile confectionary apparatus 10 may include a second liquid toppings dispensing system 74 disposed in or on the side wall 24. Similar to the liquid toppings dispensing system 12, the liquid toppings dispensing system 74 may be configurable to selectively dispense a liquid topping onto a frozen confection or to fill a container with a beverage. The second liquid toppings dispensing system 74 may include a second plurality of liquid dispensers 76 that are arranged along an axis 73 (FIG. 2). As with the liquid dispensers 40, a customer may self-serve a liquid topping with the dispensers 76, because each dispenser 76 may be connected by a liquid line (not shown) to the reservoir 66.

In one embodiment, as shown in FIGS. 1 and 3B, the longitudinal axis 36 of the liquid toppings dispensing system 12 may be arranged generally parallel with the side wall 24. In this arrangement, the plurality of liquid dispensers 76 may also be arranged generally parallel with the side wall 24 and with the longitudinal axis 36 of the liquid toppings dispensing system 12. This generally parallel arrangement may facilitate a uniform, quick flow of customers past the opening 30 and allow each customer more time within which to select and dispense a liquid topping from one or more of the liquid dispensers 40 and/or liquid dispensers 76 on to a frozen confection or dispense a beverage into a container.

Figure 7:
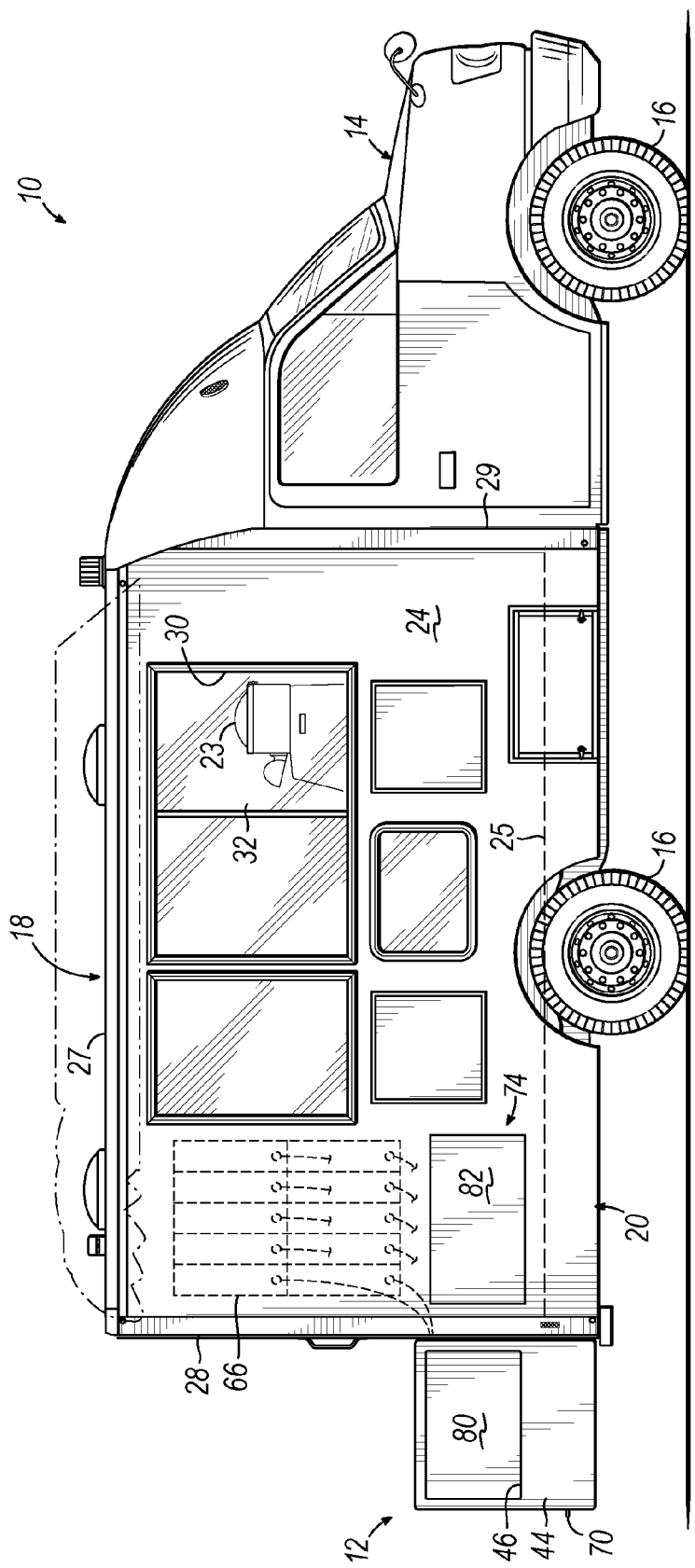
FIG. 7 is a side elevational view of a mobile confectionary apparatus according to one embodiment of the present invention.

With reference to FIG. 7, one or both of the liquid toppings dispensing systems 12, 74 may include a cover member 80, 82, respectively. Individually, cover members 80, 82 cover and protect the corresponding liquid dispensers 40, 76 during nonuse of the mobile confectionary apparatus 10. By way of example, the cover members 80, 82 may prevent natural elements, such as dirt, rain, road spray, and the like from depositing on the liquid dispensers 40, 76. The cover members 80, 82 may substantially prevent the liquid dispensers 40, 76 from being vandalized or intentionally misused. While the cover member 80 is generally usable in all positions of the liquid toppings dispensing system 12, including the position shown in FIG. 1, the cover member 80 may be used more often when the system 12 is in the position shown in FIG. 2. According to one embodiment, the plurality of liquid dispensers 40 are covered by cover members 80 in a storage position.

While the present invention has been illustrated by a description of various embodiments and while those embodiments have been described in considerable detail, it is not the intention of applicants to restrict or in any way limit the scope of the appended claims to such details. Additional advantages and modifications will readily appear to those skilled in the art. The invention in its broader aspects is therefore not limited to the specific details and illustrative examples shown and described. Accordingly, departures may be made from such details without departing from the spirit or scope of applicants' invention.

What is claimed is:

1. A mobile confectionary apparatus, comprising:
   a vehicle including at least one upstanding side wall;
   an interior space surrounded by the at least one upstanding side wall and configured to receive at least one person;
   an opening extending through the at least one upstanding side wall and through which an item may be passed from the interior space to outside of the vehicle; and
   a liquid toppings dispensing system including a housing being positioned adjacent to, and opposing, the at least one upstanding side wall and including a plurality of liquid dispensers configured to dispense at least one liquid topping onto the item, each of the plurality of liquid dispensers being in fluid communication with at least one reservoir holding the at least one liquid topping, with the liquid toppings dispensing system being located externally of the at least one upstanding side wall and spaced entirely laterally therefrom by a gap.

2. The mobile confectionary apparatus of claim 1, wherein the plurality of liquid dispensers is arranged along an axis that is generally parallel to a longitudinal axis of the liquid toppings dispensing system.

3. The mobile confectionary apparatus of claim 1 further comprising at least one tube extending from the at least one reservoir and being coupled to at least one of the plurality of liquid dispensers.

4. The mobile confectionary apparatus of claim 1, wherein the vehicle is a truck.

5. The mobile confectionary apparatus of claim 1, wherein the vehicle is a trailer.

6. The mobile confectionary apparatus of claim 1, further comprising a cover member configured to cover the plurality of liquid dispensers.

7. The mobile confectionary apparatus of claim 1, further comprises a catch basin supported by the housing and located beneath the plurality of liquid dispensers.

8. The mobile confectionary apparatus of claim 1, wherein the liquid toppings dispensing system is mounted so as to be pivotable relative to the at least one upstanding side wall.

9. The mobile confectionary apparatus of claim 8, wherein the liquid toppings dispensing system is pivotable relative to the at least one upstanding side wall between a first position and a second position such that, in the first position, the liquid toppings dispensing system is displaced away from the at least one upstanding side wall and, in the second position, an axis of the plurality of liquid dispensers is located generally parallel to the at least one upstanding side wall.

10. The mobile confectionary apparatus of claim 3, further comprising at least one port in the at least on upstanding side wall through which the at least one tube extends to couple the at least one reservoir to the at least one of the plurality of liquid dispensers.

11. The mobile confectionary apparatus of claim 9, further comprising at least one hinge supported by the at least one upstanding side wall and defining an axis about which the liquid toppings dispensing system is pivotable between the first position and the second position.

* * * * *

UNITED STATES PATENT AND TRADEMARK OFFICE
CERTIFICATE OF CORRECTION

PATENT NO. : 9,751,447 B2
APPLICATION NO. : 14/870439
DATED : September 5, 2017
INVENTOR(S) : Tony Lamb Page 1 of 1

It is certified that error appears in the above-identified patent and that said Letters Patent is hereby corrected as shown below:

In the Specification

In Column 4, Line 12, change "such as, a truck," to --such as a truck,--.

In Column 4, Lines 50-51, change "such as, equipment" to --such as equipment--.

In Column 6, Line 7, change "that is a not perpendicular" to --that is not perpendicular--.

In Column 6, Line 23, change "At described above," to --As described above,--.

In the Claims

In Claim 10, Column 10, Line 35, change "comprising at least one port in the at least on upstanding" to --comprising at least one port in the at least one upstanding--.

Signed and Sealed this
Twenty-first Day of November, 2017

Joseph Matal
*Performing the Functions and Duties of the*
*Under Secretary of Commerce for Intellectual Property and*
*Director of the United States Patent and Trademark Office*